(12) United States Patent
Kodavati (10) Patent No.: US 7,408,979 B2
(45) Date of Patent: Aug. 5, 2008

(54) INTEGRATED RADIO CIRCUIT HAVING MULTIPLE FUNCTION I/O MODULES

(75) Inventor: Venkat Kodavati, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 865 days.

(21) Appl. No.: 10/879,338

(22) Filed: Jun. 28, 2004

(65) Prior Publication Data
US 2005/0286616 A1 Dec. 29, 2005

(51) Int. Cl.
H04L 5/16 (2006.01)

(52) U.S. Cl. .................. 375/219; 455/552.1; 455/73; 455/82; 455/323

(58) Field of Classification Search .................. 375/219, 375/346; 455/73, 82, 323, 127.4, 552.1, 455/313, 131; 370/338
See application file for complete search history.

(56) References Cited

U.S. PATENT DOCUMENTS

2003/0203743 A1* 10/2003 Sugar et al. .............. 455/550.1

* cited by examiner

Primary Examiner—Mohammad Ghayour
Assistant Examiner—Sonia J King
(74) Attorney, Agent, or Firm—Garlick, Harrison & Markison; Timothy W. Markison (57) ABSTRACT

An integrated radio circuit includes a receiver section, a transmitter section, an analog to digital converter section, a digital to analog converter section, a digital baseband processing module, a first dual function input/output (I/O) module, and a second dual function I/O module. The first dual function input/output (I/O) module is operably coupled to provide inbound digital baseband signals as selected inbound digital baseband signals to the digital baseband processing module when the integrated radio circuit is in a normal mode of operation and to provide test inbound digital baseband signals as the selected inbound digital baseband signals to the digital baseband processing module when the integrated radio circuit is in a test mode. The second dual function I/O module is operably coupled to provide outbound digital baseband signals to the digital to analog converter section when the integrated radio circuit is in the normal mode of operation and to output the outbound digital baseband signals when the integrated radio circuit is in the test mode.

26 Claims, 8 Drawing Sheets

FIG. 3
Radio 60

FIG. 4

FIG. 7
radio 60

FIG. 8
radio 60

FIG. 9
radio 60

INTEGRATED RADIO CIRCUIT HAVING MULTIPLE FUNCTION I/O MODULES

TECHNICAL FIELD OF THE INVENTION

This invention relates generally to wireless communication systems and more particularly to integrated radio circuits of wireless communication devices that operate in such wireless communication systems.

DESCRIPTION OF RELATED ART

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is further known, at least a portion of the receiver and at least a portion of the transmitter of a radio transceiver may be implemented as an integrated circuit. Such radio transceiver integrated circuits enable small form factors for wireless communication devices providing great versatility for wireless communications. While there are many advantages to radio transceiver integrated circuits, their complex nature makes them difficult to accurately test. As such, radio transceiver integrated circuits are primarily tested on a pass-fail basis with little insight as to the reason or reasons for a failure.

Therefore, a need exists for a radio integrated circuit that includes multiple function input/output modules that enable more detailed testing and failure analysis of radio integrated circuits.

BRIEF SUMMARY OF THE INVENTION

The radio integrated circuit that includes multiple function I/O modules of the present invention substantially meets these needs and others. In one embodiment, an integrated radio circuit includes a receiver section, a transmitter section, an analog to digital converter section, a digital to analog converter section, a digital baseband processing module, a first dual function input/output (I/O) module, and a second dual function I/O module. The receiver section is operably coupled to convert inbound radio frequency (RF) signals into inbound baseband signals. The transmitter section is operably coupled to convert selected outbound baseband signals into outbound RF signals. The analog to digital converter section is operably coupled to convert the inbound baseband signals into inbound digital baseband signals. The digital to analog converter section is operably coupled to convert outbound digital baseband signals into the outbound baseband signals. The digital baseband processing module is operably coupled to convert selected inbound digital baseband signals into inbound data and to convert outbound data into outbound digital baseband signals. The first dual function input/output (I/O) module is operably coupled to provide the inbound digital baseband signals as the selected inbound digital baseband signals to the digital baseband processing module when the integrated radio circuit is in a normal mode of operation and to provide test inbound digital baseband signals as the selected inbound digital baseband signals to the digital baseband processing module when the integrated radio circuit is in a test mode. The second dual function I/O module is operably coupled to provide the outbound digital baseband signals to the digital to analog converter section when the integrated radio circuit is in the normal mode of operation and to output the outbound digital baseband signals when the integrated radio circuit is in the test mode.

In another embodiment, an integrated radio circuit includes a receiver section, a transmitter section, an analog to digital converter section, a digital to analog converter section, a digital baseband processing module, a first dual function input/output (I/O) module, and a second dual function I/O module. The receiver section is operably coupled to convert inbound radio frequency (RF) signals into inbound baseband signals. The transmitter section is operably coupled to convert selected outbound baseband signals into outbound RF signals. The analog to digital converter is section operably coupled to convert inbound baseband signals into inbound digital baseband signals. The digital to analog converter section is operably coupled to convert outbound digital baseband signals into the outbound baseband signals. The digital baseband processing module is operably coupled to convert the inbound digital baseband signals into inbound data and to convert outbound data into the outbound digital baseband signals. The first dual function I/O module is operably coupled to provide the inbound baseband signals to the analog to digital converter section when the integrated radio circuit is in a normal mode of operation and to output the inbound baseband signals when the integrated radio circuit is in a test mode. The second dual function I/O module is operably coupled to provide the outbound baseband signals as the selected outbound baseband signals to the transmitter section when the integrated radio circuit is in the normal mode of operation and to provide test outbound baseband signals as the selected outbound baseband signals to the transmitter section when the integrated radio circuit is in the test mode.

In yet another embodiment, an integrated radio circuit includes a receiver section, a transmitter section, an analog to digital converter section. a digital to analog converter section, digital baseband processing module, and a dual function I/O module. The receiver section is operably coupled to convert inbound radio frequency (RF) signals into inbound baseband signals. The transmitter section is operably coupled to convert selected outbound baseband signals into outbound RF signals. The analog to digital converter section is operably coupled to convert inbound baseband signals into inbound digital baseband signals. The digital to analog converter section is operably coupled to convert outbound digital baseband signals into the outbound baseband signals. The digital baseband processing module is operably coupled to convert the inbound digital baseband signals into inbound data and to convert outbound data into the outbound digital baseband signals. The dual function I/O module is operably coupled to the digital baseband processing module, the transmitter section, and the receiver section, wherein, during a receiver test mode, the dual function I/O module provides receiver controls signals to the receiver section while the transmitter section, the analog to digital converter module, the digital to analog converter section, and the digital baseband processing module are inactive and, during a transmitter test mode, the dual function I/O module provides transmitter controls signals to the transmitter section while the receiver section, the analog to digital converter module, the digital to analog converter section, and the digital baseband processing module are inactive.

DETAILED DESCRIPTION OF THE INVENTION

Figure 1:
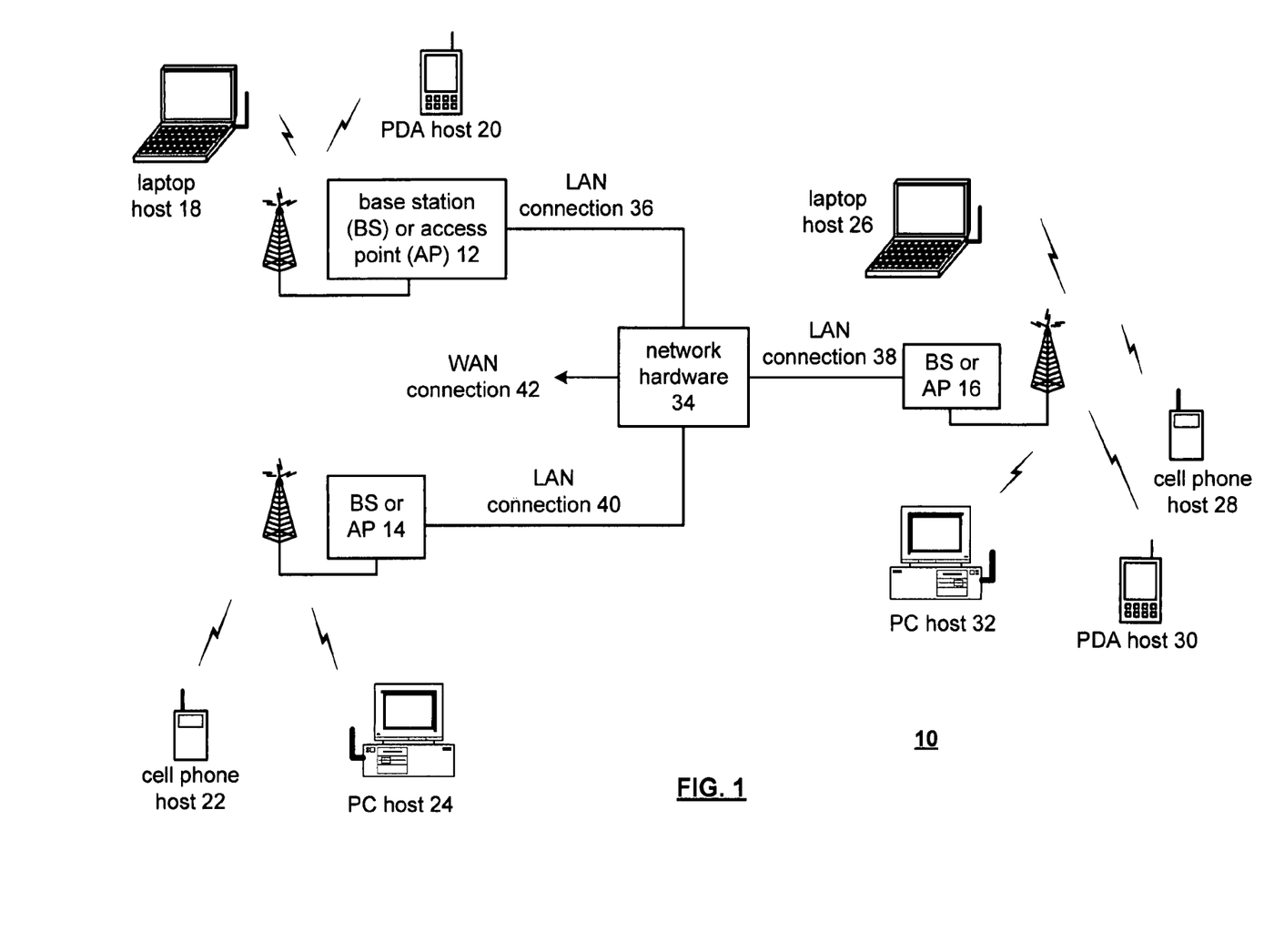
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
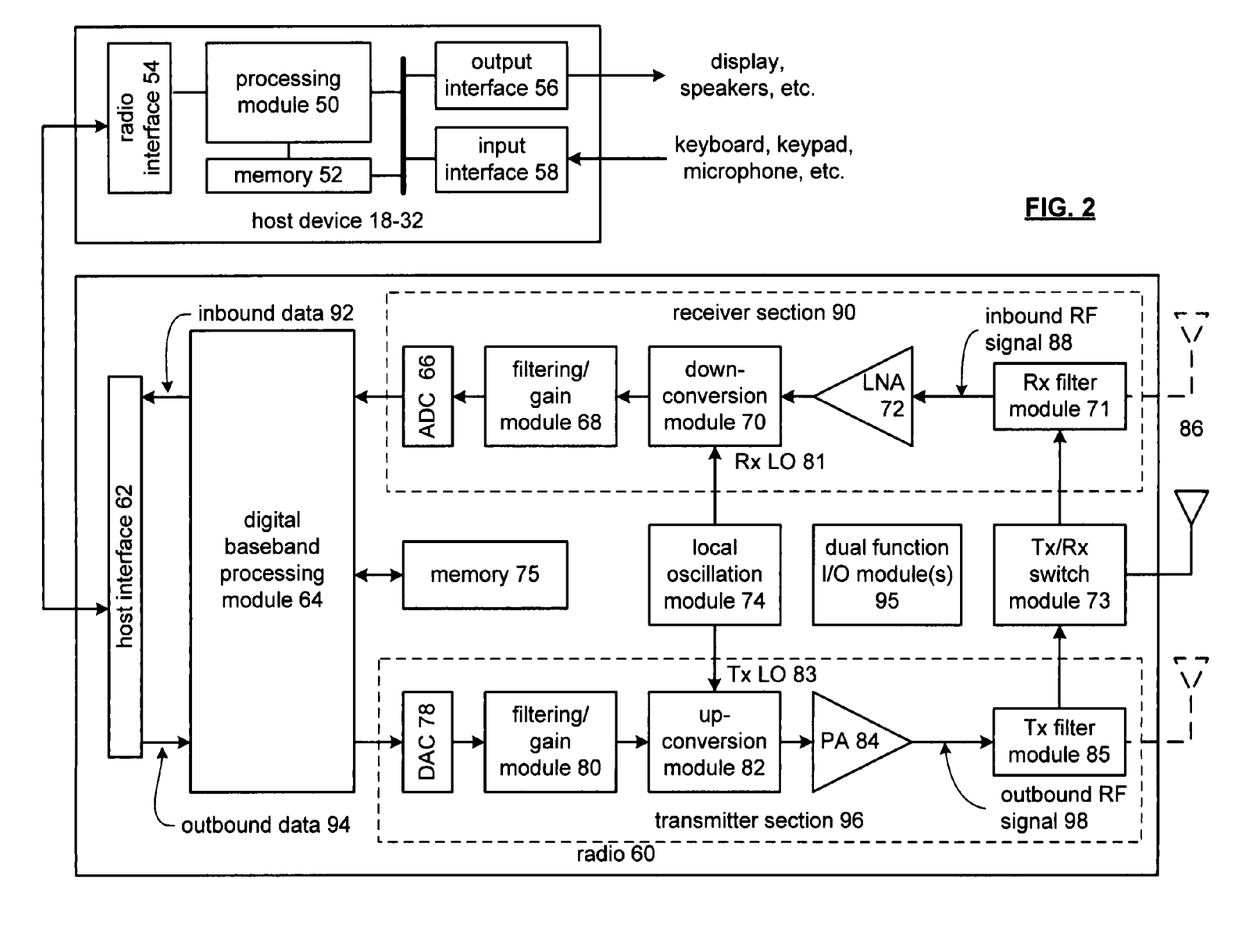
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output, interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital baseband processing module 64, a receiver section 90, a transmitter section 96, a transmit/receive (Tx/Rx) switch module 73, a local oscillation module 74, memory 75, an antenna 86, and at least one dual function I/O module 95, which will be described in greater detail with reference to FIGS. 3-9. The receiver section 90 includes an analog-to-digital converter section 66, a filtering/gain module 68, an IF mixing down conversion stage 70, a receiver filter 71, and a low noise amplifier 72. The transmitter section 96 includes a digital-to-analog converter 78, a filtering/gain module 80, an IF mixing up conversion stage 82, a power amplifier 84, and a transmitter filter module 85. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital baseband processing module 64, in combination with operational instructions stored in memory 75, executes digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital baseband processing module 64 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital baseband processing module 64, which processes the outbound data 94 in accordance with a particular wireless communication standard (e.g., IEEE 802.11 Bluetooth, et cetera) to produce digital transmission formatted data. The digital transmission formatted data will be a digital base-band signal or a digital low IF signal, where the low IF typically will be in the frequency range of one hundred kilohertz to a few megahertz.

The digital-to-analog converter 78 converts the digital transmission formatted data from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted, data. The digital baseband processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
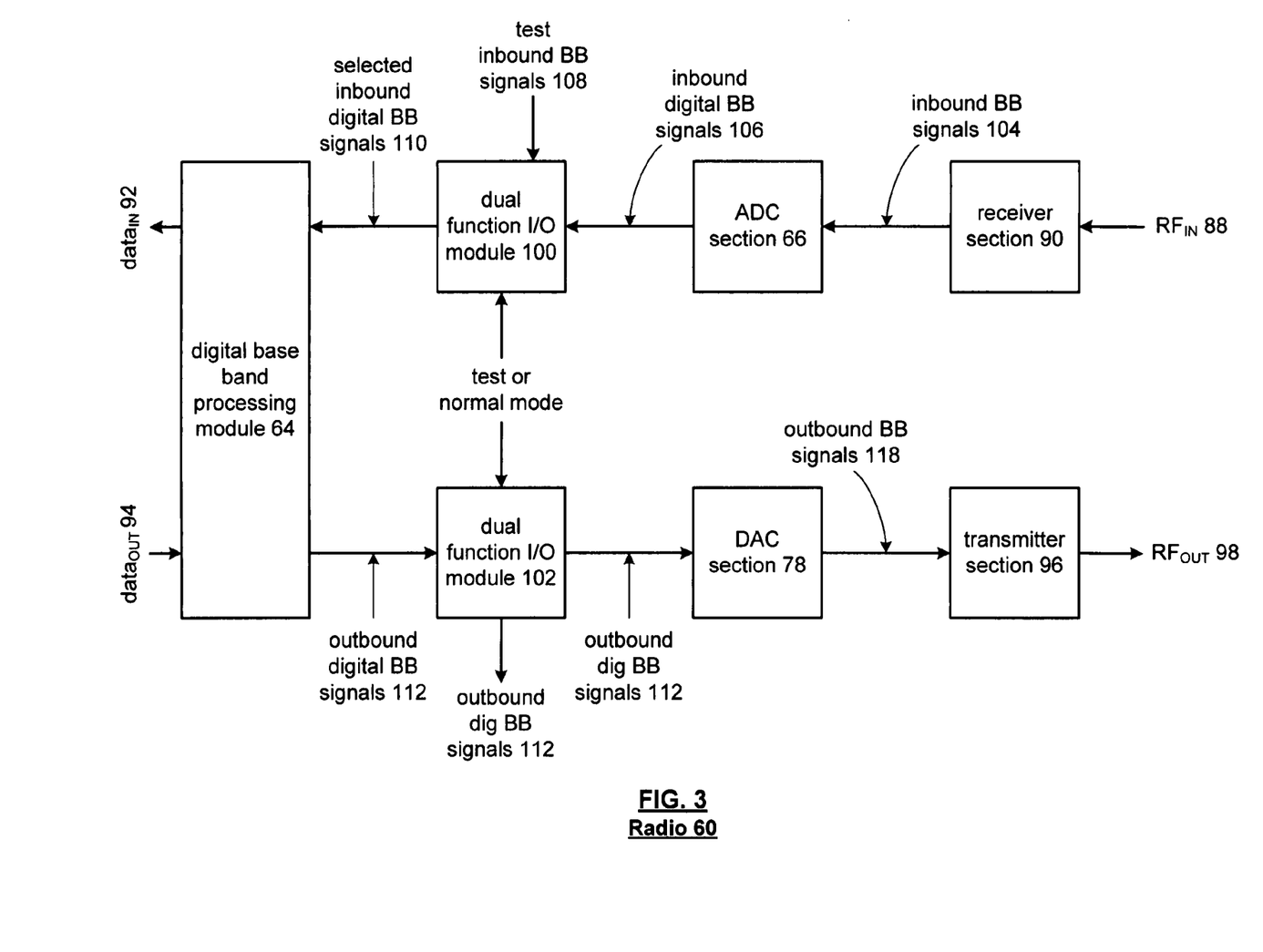
FIG. 3 is a schematic block diagram of a radio integrated circuit in accordance with the present invention.

FIG. 3 is a schematic block diagram of an embodiment of radio 60 that includes the digital baseband processing module 64, dual function 1/O module 100, analog-to-digital converter section 66, receiver section 90, transmitter section 96, digital-to-analog converter section 78 and dual function I/O module 102. As shown, the receiver section 90 converts inbound RF signals 88 into inbound baseband signals 104. The analog-to-digital converter section 66 which may include two analog-to-digital converters, one for an in-phase component of the inbound baseband signals 104 and one for a quadrature component of inbound baseband signals 104, converts the inbound baseband signals 104 into inbound digital baseband signals 106. The dual function I/O module 100, which will be described in greater detail in FIGS. 4, 5 and 9, either provides test inbound digital baseband signals 108 as selected inbound digital baseband signals 110 during test mode of radio 60 or provides the inbound digital baseband signals 106 as the selected inbound digital baseband signals 110 during normal mode of radio 60. The digital baseband processing module 64 converts the selected inbound digital baseband signals 110 into the inbound data 92.

Figure 4:
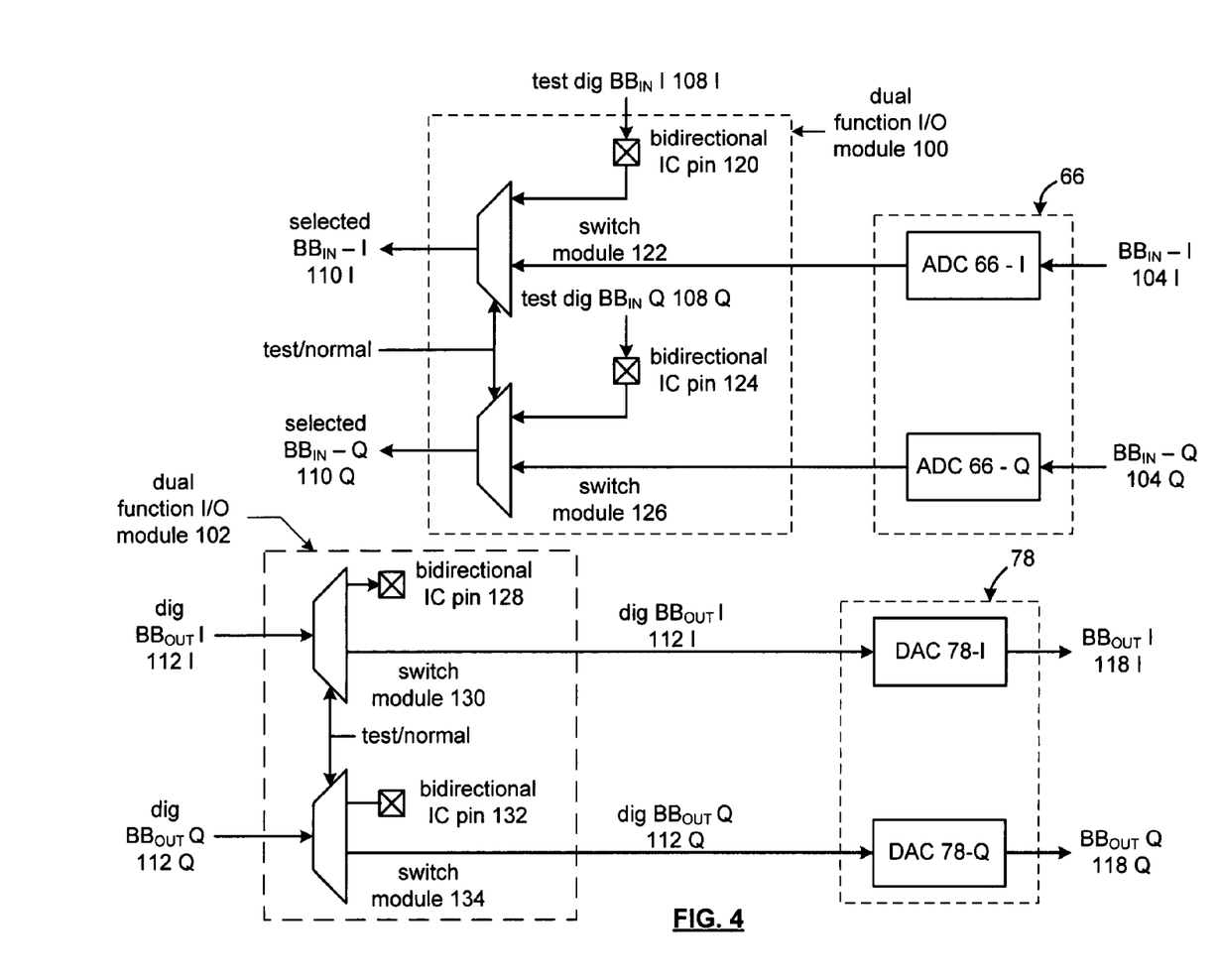
FIG. 4 is a schematic block diagram of dual function I/O modules of the radio of FIG. 3.
Figure 6:
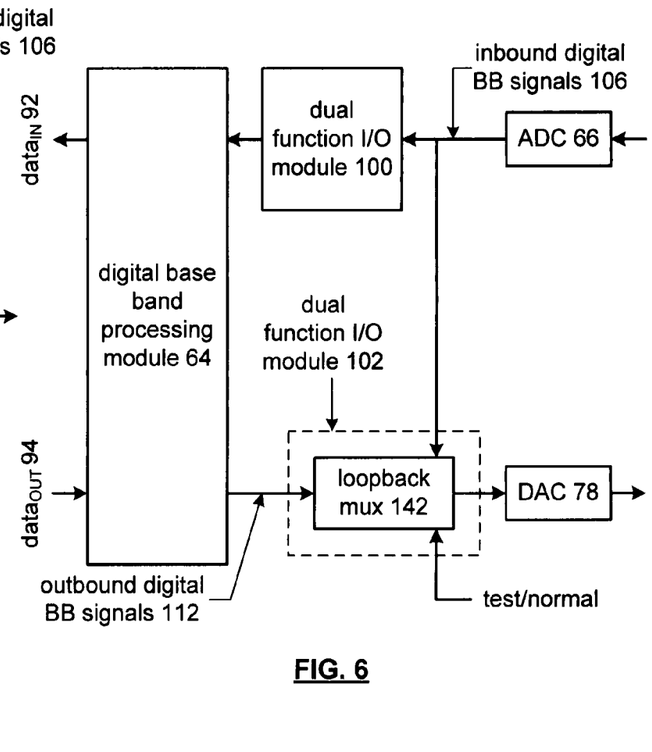
FIG. 6 is a schematic block diagram of a portion of yet another embodiment of a radio in accordance with the present invention.
Figure 9:
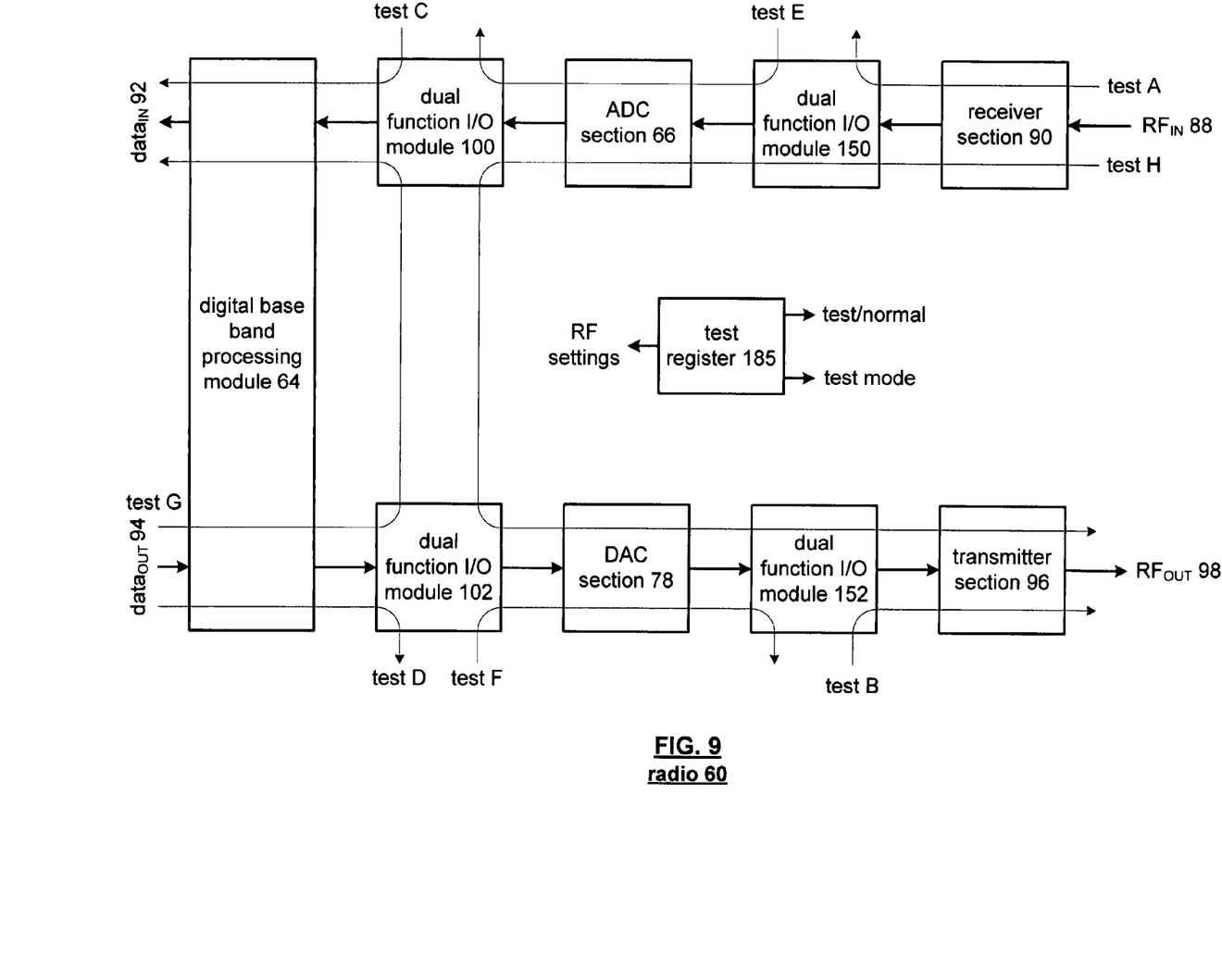
FIG. 9 is a schematic block diagram of a further embodiment of a radio in accordance with the present invention.

The digital baseband processing module 64 converts outbound data 94 into outbound digital baseband signals 112. Note that, in one embodiment, the outbound digital baseband signal 112 may include an in-phase component and a quadrature component, which in this instance, the digital-to-analog converter section 78 includes two digital-to-analog converters, one for the in-phase component and another for the quadrature component. The dual function I/O module 102, which will be described in greater detail with reference to FIGS. 4, 6 and 9, provides the outbound digital baseband signals 112 to the digital-to-analog converter section 78 during normal mode of radio 60 and outputs to a pin of the integrated circuit containing radio 60 when radio 60 is in a test mode. The digital-to-analog converter section 78 converts the outbound digital baseband signals 112 into outbound baseband signals 118. The transmitter section 96 converts the outbound baseband signals 118 into outbound RF signals 98.

FIG. 4 is a schematic block diagram of the dual I/O function module 100 and the dual function I/O module 102, which enable testing of the digital baseband processing module 64. In this instance, the analog-to-digital converter section 66 includes two analog-to-digital converters 66-I and 66-Q. Similarly, the digital-to-analog converter section 78 includes two digital-to-analog converters 78-I and 78-Q. The dual function I/O module 100 includes two bi-directional integrated circuit pins 120 and 124 and two multiplexers. The bi-directional integrated circuit pin, when in a test mode, couples test digital baseband inbound in-phase component signals 108 to the $1^{st}$ multiplexer and the $2^{nd}$ bi-directional IC pin 124 provides quadrature components of the test digital baseband inbound signal 108-Q to the $2^{nd}$ multiplexer. The control signal for the multiplexers is in the test mode such that the test digital baseband inbound signals are passed to the digital baseband processing module 64 such that the processing performed by the digital baseband processing module 64 can be tested utilizing the test inbound baseband signals 108. During a normal mode, the $1^{st}$ multiplexer, or switch module 122, provides the digital baseband in-phase signal as the selected baseband inbound signal 110 during normal mode and switch module 126 provides the digital baseband inbound quadrature component as the selected baseband inbound quadrature component 110-Q to the digital baseband processing module 64. During the normal mode, the bi-directional pins 120 and 124 are utilized for an input and/or output of the radio 60.

The dual function I/O module 102 includes two bi-directional integrated circuit pins 128 and 132 and two switch modules 130 and 134, which may be multiplexers. During test mode, the in-phase and quadrature digital baseband outputs 112-I and 112-Q from the digital baseband processing module 64 are provided to the bi-directional integrated circuit pins 128 and 132 via the switch modules 130 and 134. In this mode, the processing performed by the digital baseband processing module 64 in converting the data output 94 into outbound digital baseband signals 112 may be tested.

During normal mode, the control signals of the switch modules 130 and 134 is set such that the switch modules 130 and 134 pass the in-phase and quadrature components of the digital baseband output signals 112 to the corresponding digital-to-analog converters 78-I and 78-Q of the digital-to-analog converter section 78.

Figure 5:
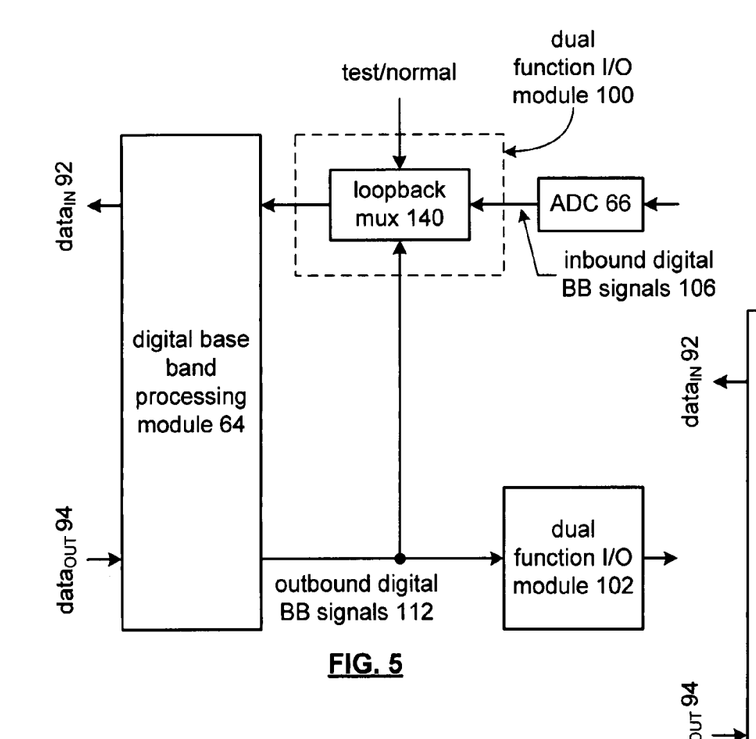
FIG. 5 is a schematic block diagram of a portion of another embodiment of a radio in accordance with the present invention.

FIG. 5 illustrates a schematic block diagram of a portion of radio 60 where the dual I/O function module 100 is expanded to include a loop-back multiplexer 140. In this example, during test mode, the loop-back multiplexer receives, as inputs the output of the analog-to-digital converter section 66 and the outbound digital baseband signals 112. During normal mode, the loop-back multiplexer 140 provides the output of the analog-to-digital converter 66 to the digital baseband processing module 64.

During test mode, the loop-back multiplexer 140 provides the outbound digital baseband signals 112 to the digital baseband processing module 64. In test mode, test outbound data 94 may be provided to the digital baseband processing module 64 where in the loop-back mode, the test outbound digital baseband signals 112 are fed back to the digital baseband processing module 64 which then produces test inbound signals data 92. As such, by feeding test outbound data 94 into the processing module 64 and monitoring the inbound data 92, the digital baseband processing module may be tested in another manner.

FIG. 6 illustrates a schematic block diagram of another portion of the radio 60 where the $2^{nd}$ dual function I/O module 102 is expanded to include a loop-back multiplexer 142. In normal mode, the loop-back multiplexer 142 provides the outbound digital baseband signals 112 from the digital baseband processing module 64 to the digital-to-analog converter section 78.

During test mode, the loop-back multiplexer 142 provides the inbound digital baseband signals 106 from the analog-to-digital converter 66 to the digital-to-analog. converter 78. In this instance, tests radio frequency signals may be provided to the receiver section 90, which are then fed to the digital-to-analog converter section 78 and re-converted into RF signals via transmitter section 96. In this test mode, the receiver section 90, analog-to-digital section 66, digital-to-analog converter section 78 and transmitter section 96 may be tested for proper functioning.

Figure 7:
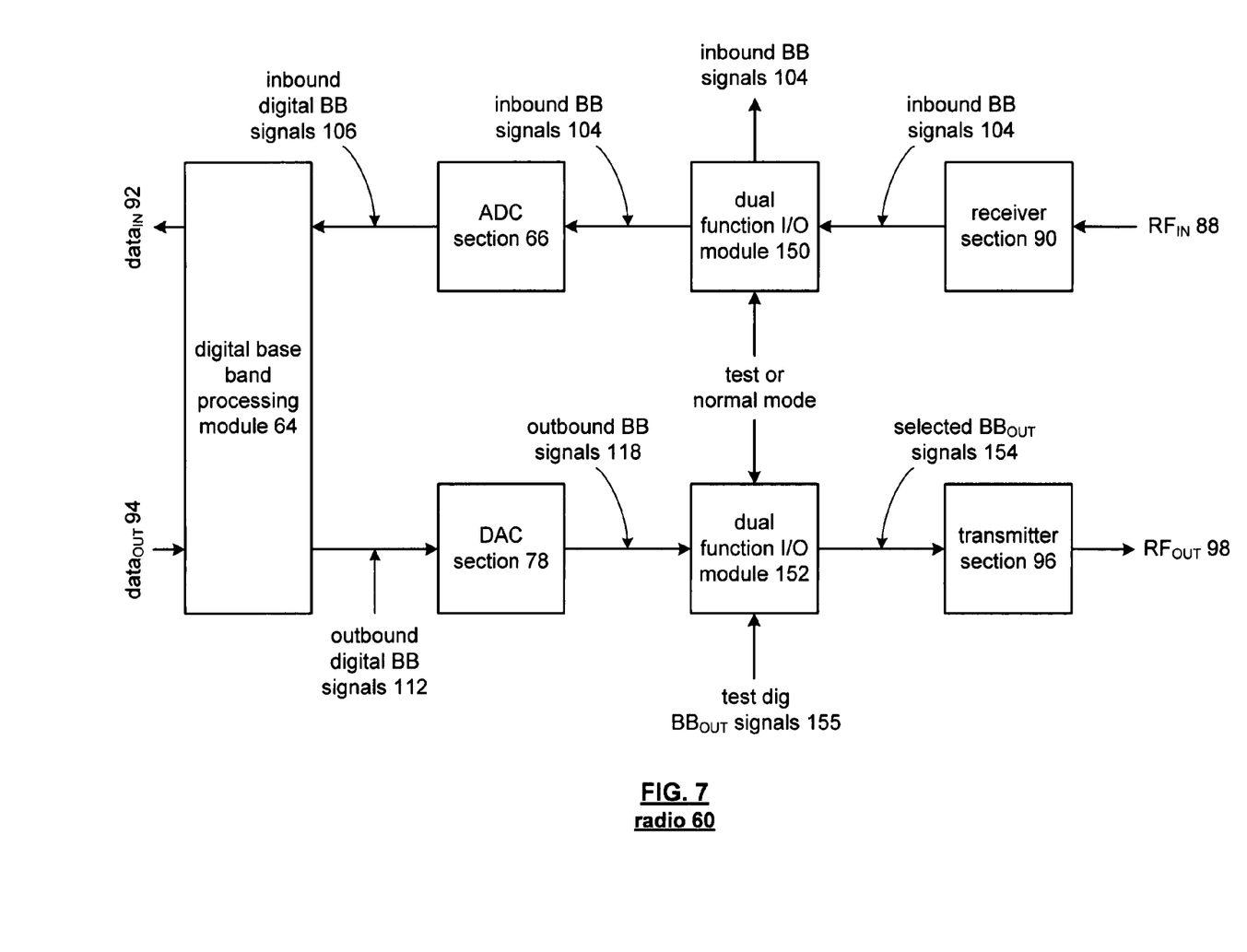
FIG. 7 is a schematic block diagram of another embodiment of a radio in accordance with the present invention.

FIG. 7 is a schematic block diagram of another embodiment of radio 60 that includes receiver section 90, dual function I/O module 150, analog-to-digital converter section 66, digital baseband processing module 64, digital-to-analog converter section 78, dual function I/O module 152 and transmitter section 96. The receiver section 90 converts inbound radio frequency signals 88 into inbound baseband signals 104. The dual function I/O module 50, which may be constructed similarly to one or more of the dual function I/O modules 102 and 104 as shown in FIG. 4, provides the inbound baseband signals 104 to the analog-to-digital converter section 66 during normal mode of operation of radio 60. During test mode of radio 60, the dual I/O module 150 outputs the inbound baseband signals 104 to an integrated circuit pin of radio 60 such that the functionality of the receiver section 90 may be tested.

The analog-to-digital converter 66 converts the inbound baseband signals 104 into inbound digital baseband signals 106. The digital baseband processing module 64 converts the inbound digital baseband signals 106 into inbound data 92.

The digital baseband processing module 64 also converts outbound data 94 into outbound baseband signals 112. The digital-to-analog converter section 78 converts outbound digital baseband signals 112 into outbound baseband signals 118. The dual function I/O module 152 passes the outbound baseband signals 118 as selected outbound baseband signals 154 during normal mode of the radio 60. During test mode of radio 60, the dual I/O module 152 which may be constructed similarly to I/O module 100 and/or 102 as shown in FIG. 4, provides test digital baseband output signals 155 as the selected baseband output signals 154. The transmitter section 96 converts the selected baseband output signals 154 into the outbound RF signals 98. Note that during test mode, the dual function I/O module 152 allows for testing of the transmitter section 96 by providing test digital baseband signals and monitoring the RF outbound signals 98.

Figure 8:
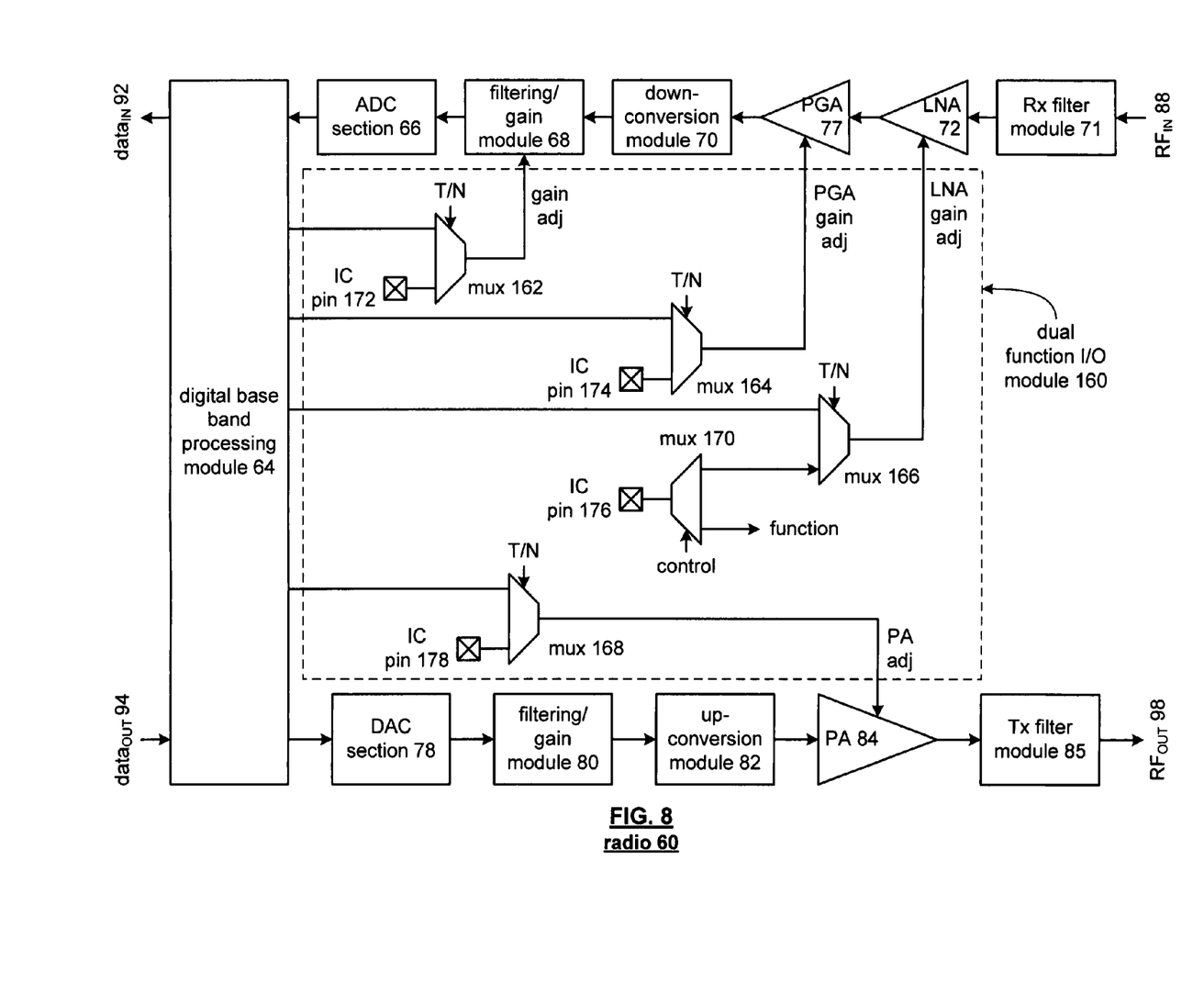
FIG. 8 is a schematic block diagram of yet another embodiment of a radio in accordance with the present invention.

FIG. 8 is a schematic block diagram of another embodiment of radio 60. In this embodiment, radio 60 includes the receiver filter module 71, low noise amplifier 72, programmable gain amplifier 77, down-conversion module 70, filter/gain module 68, analog-to-digital converter section 66, digital baseband processing module 64, digital-to-analog converter section 78, filter/gain module 80, up-conversion module 82, power amplifier 84, transmit filter module 85 and dual function I/O module 160. In the dual function I/O module 160 includes a plurality of multiplexers 162-168 and a plurality of bi-directional integrated circuit pins 172-178.

During normal mode of operation of radio 60, the multiplexers 162-168 provide the gain control settings from the digital baseband processing module 64 to the corresponding components. For instance, multiplexer 162 provides the gain adjust for filter/gain module 68 from the digital baseband processing module 64. Multiplexer 164 provides the programmable gain amplifier gain adjustment, multiplexer 166 provides the low noise amplifier gain adjustment and multiplexer 168 provides the power amplifier gain adjust.

During test mode, the other input of multiplexers 162-168 may be provided directly from the corresponding integrated circuit pin 172-178 or, via a control multiplexer 170. As shown, multiplexer 170 has its input coupled to integrated circuit pin 176 and based on the state of a control signal couples the integrated circuit pin 176 to the input of multiplexer 66 or couples it to another function within radio 60. In either embodiment, the access to the corresponding integrated circuit pins 172-178 allow for test adjustments of the gain of the corresponding elements. For example, by having access to integrated circuit pin 174, the gain of the programmable gain amplifier may be adjusted and the overall performance of the radio 60 may be tested based on such gain adjustments. Further, the gain adjustments may be utilized during calibration of radio 60 to determine nominal settings for each of the components (e.g., module 68, PGA 77, LNA 72 and PA 84) for optimal operations during normal mode operations.

FIG. 9 is a schematic block diagram of yet another embodiment of radio 60. In this embodiment, radio 60 includes receiver section 90, dual function I/O module 150, analog-to-digital converter section 66, dual function I/O module 100, digital baseband processing module 64, dual function I/O module 102, digital-to-analog converter section 78, dual function I/O module 152 and transmitter section 96, and test register 185. The test register 185 may store the test settings or test signals for the various gain settings within receiver section 90 and transmitter section 96 for normal mode and/or test mode and further may store the test signals that are provided to corresponding blocks within radio 60.

As shown, a plurality of tests may be performed on radio 60 during the test mode to accurately test the performance of each section within radio 60. For instance, test A enables testing of receiver section 90 by providing test RF input signals 88 to receiver section and monitoring the resulting baseband signals via the dual I/O function module 150. Test B allows for the testing of transmitter section 96 by providing test baseband signals from the dual I/O function module 152 to transmitter section 96 and monitoring the resulting RF outbound signals 98.

Test C allows for the testing of the digital baseband processing module 64 in converting digital inbound baseband signals into inbound data 92 by providing test inbound digital baseband signals from the dual function I/O module 100 to the digital baseband processing module 64 and monitoring the resulting inbound data 92.

Test D allows for testing of the digital baseband processing module in converting the outbound data 94 into digital baseband signals. The dual I/O module 102 outputs the digital baseband test signals such that they may be monitored.

Test E allows for testing of the analog-to-digital converter section 66 by providing test inbound baseband signals from the dual I/O function module 150 to the analog-to-digital converter section 66. The resulting digital signals are outputted via the dual function I/O module 100 such that the digital representations of the analog-to-digital test signals may be monitored.

Test F enables testing of the digital-to-analog converter section 78 by providing test digital baseband signals to the digital-to-analog converter section 78 via dual function I/O module 102. The resulting analog signals may be outputted via the dual function I/O module 152.

Test G in a loop-back provides simultaneous testing of the transmit functionality and receive functionality of the digital baseband processing module 64. In this test, test outbound data 94 is provided to the digital baseband processing module 64 which converts the test data into outbound digital baseband test signals. Dual functions I/O modules 100 and 102 loop-back the test outbound digital baseband signals to the input of the receiver portion of digital baseband processing module 64. The digital baseband processing module 64 converts the loop-back test outbound digital baseband signals and produces test inbound data 92. If the digital baseband processing module 64 is functioning properly, the inbound data 92 should substantially match the outbound data 94.

Test H allows for testing of the radio receiver 90, analog-to-digital converter section 66, digital-to-analog converter section 78 and transmitter section 96. In this test, test RF inbound signals 88 are provided to receiver 90, which are converted to inbound baseband signals. The analog-to-digital converter section converts the inbound baseband signals into digital signals which are then provided via dual function I/O modules 100 and 102 to the digital-to-analog converter section 78. The digital-to-analog converter section 78 converts the signals back into the analog domain, which are provided to the transmitter section 96 via dual function I/O module 152. The transmitter section 96 converts the analog baseband signals into outbound RF signals 98. If this portion of the radio 60 is functioning properly, the outbound RF signals 98 should substantially match the inbound RF test signals 88.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for testing an integrated radio circuit. As one of average skill in the art will appreciate, other embodiments may be derived from the teaching of the present invention without deviating from the scope of the claims.

What is claimed is:

1. An integrated radio circuit comprises:
   a receiver section operably coupled to convert inbound radio frequency (RF) signals into inbound baseband signals;
   a transmitter section operably coupled to convert selected outbound baseband signals into outbound RF signals;
   analog to digital converter section operably coupled to convert the inbound baseband signals into inbound digital baseband signals;
   digital to analog converter section operably coupled to convert outbound digital baseband signals into the outbound baseband signals;
   digital baseband processing module operably coupled to convert selected inbound digital baseband signals into inbound data and to convert outbound data into outbound digital baseband signals;
   first dual function input/output (I/O) module operably coupled to provide the inbound digital baseband signals as the selected inbound digital baseband signals to the digital baseband processing module when the integrated radio circuit is in a normal mode of operation and to provide test inbound digital baseband signals as the selected inbound digital baseband signals to the digital baseband processing module when the integrated radio circuit is in a test mode; and
   second dual function I/O module operably coupled to provide the outbound digital baseband signals to the digital to analog converter section when the integrated radio circuit is in the normal mode of operation and to output the outbound digital baseband signals when the integrated radio circuit is in the test mode.

2. The integrated radio circuit of claim 1, wherein the first dual function I/O module comprises:
   a bidirectional integrated circuit pin; and
   switch module having a first input, a second input, and an output, wherein the first input of the switch module is operably coupled to receive the test inbound digital baseband signals from the bidirectional integrated circuit pin and the input of the switch module is operably coupled to receive the inbound digital baseband signals from the analog to digital converter, and wherein the switching module outputs, via the output, the test inbound digital baseband signals when a register setting indicates the test mode and outputs, via the output, the inbound digital baseband signals when the register setting indicates the normal mode of operation.

3. The integrated radio circuit of claim 1, wherein the second dual function I/O module comprises:
   a bidirectional integrated circuit pin; and
   switch module having a first input, a second input, and an output, wherein the first input of the switch module is operably coupled to receive the test outbound digital baseband signals from the bidirectional integrated circuit pin and the second input of the switch module is operably coupled to receive the outbound digital baseband signals from the digital baseband processing module, and wherein the second dual function I/O module outputs, via the output, the test outbound digital baseband signals when a register setting indicates the test mode and outputs, via the output, the outbound digital baseband signals when the register setting indicates the normal mode of operation.

4. The integrated radio circuit of claim 1 further comprises:
   a third dual function I/O module operably coupled between the receiver section and the analog to digital converter, wherein, in the normal mode of operation, the third dual function I/O module provides the inbound baseband signals to the analog to digital converter section and, in a second test mode, the third dual function I/O module outputs the inbound baseband signals.

5. The integrated radio circuit of claim 1 further comprises:
   a fourth dual function I/O module operably coupled between the transmitter section and the digital to analog converter section, wherein, in the normal mode of operation, the fourth dual function I/O module provides the outbound baseband signals to the transmitter section and, in a second test mode, the fourth dual function I/O module provides test outbound baseband signals to the transmitter section.

6. The integrated radio circuit of claim 1, wherein the second dual function I/O module comprises:
   a loop back multiplexer having a first input, a second input, and an output, wherein the first input of the loop back multiplexer is operably coupled to an output of the digital baseband processing module, the second input of the loop back multiplexer is operably coupled to an output of the analog to digital converter module, and the output of the loop back multiplexer is operably coupled to an input of the digital to analog converter section; wherein, during an ADC and DAC test portion of the test mode, the analog to digital converter module converts analog input test signals to digital test signals, wherein the first loop back multiplexer provides the digital test signals to the digital to analog converter, which converts the digital test signals into analog output test signals, wherein the receiver section, the transmitter section, and the digital baseband processing module are inactive during the ADC and DAC test portion of the test mode.

7. The integrated radio circuit of claim 1, wherein the first dual function I/O module comprises:
   a loop back multiplexer having a first input, a second input, and an output, wherein the first input of the loop back multiplexer is operably coupled to an output of the analog to digital converter module, the second input of the loop back multiplexer is operably coupled to a digital output of the digital baseband processing module, and the output of the loop back multiplexer is operably coupled to a digital input of the digital baseband processing module, wherein during a digital baseband testing portion of the test mode, the digital baseband processing module converts outbound test data into outbound test baseband signals, wherein the loop back multiplexer provides the outbound test baseband signals to the input of the digital baseband processing module, which converts the outbound test baseband signals into inbound test data.

8. The integrated radio circuit of claim 1 further comprises:
a third dual function I/O module operably coupled to the digital baseband processing module, the transmitter section, and the receiver section, wherein, during a receiver test portion of the test mode, the third dual function I/O module provides receiver controls signals to the receiver section while the transmitter section, the analog to digital converter module, the digital to analog converter section, and the digital baseband processing module are inactive and, during a transmitter test portion of the test mode, the third dual function I/O module provides transmitter controls signals to the transmitter section while the receiver section, the analog to digital converter module, the digital to analog converter section, and the digital baseband processing module are inactive.

9. The integrated radio circuit of claim 8 further comprises:
a radio register operable to store transmitter settings corresponding to the transmitter section and to store receiver settings corresponding to the receiver section, wherein, during the test mode of the integrated radio circuit, test transmitter settings and test receiver settings are written into the radio register for testing the receiver section and the transmitter section.

10. An integrated radio circuit comprises:
a receiver section operably coupled to convert inbound radio frequency (RF) signals into inbound baseband signals;
a transmitter section operably coupled to convert selected outbound baseband signals into outbound RF signals;
analog to digital converter section operably coupled to convert inbound baseband signals into inbound digital baseband signals;
digital to analog converter section operably coupled to convert outbound digital baseband signals into the outbound baseband signals;
digital baseband processing module operably coupled to convert the inbound digital baseband signals into inbound data and to convert outbound data into the outbound digital baseband signals;
a first dual function I/O module operably coupled to provide the inbound baseband signals to the analog to digital converter section when the integrated radio circuit is in a normal mode of operation and to output the inbound baseband signals when the integrated radio circuit is in a test mode; and
a second dual function I/O module operably coupled to provide the outbound baseband signals as the selected outbound baseband signals to the transmitter section when the integrated radio circuit is in the normal mode of operation and to provide test outbound baseband signals as the selected outbound baseband signals to the transmitter section when the integrated radio circuit is in the test mode.

11. The integrated radio circuit of claim 10, wherein the first dual function I/O module comprises:
a bidirectional integrated circuit pin; and
switch module having an input, a first output, and a second output, wherein the first input of the switch module is operably coupled to receive the inbound baseband signals, wherein the switching module outputs, via the output, the inbound baseband signals to the bidirectional integrated circuit pin when a register setting indicates the test mode and outputs, via the output, the inbound baseband signals to the analog to digital converter section when the register setting indicates the normal mode of operation.

12. The integrated radio circuit of claim 10, wherein the second dual function I/O module comprises:
a bidirectional integrated circuit pin; and
switch module having a first input, a second input, and an output, wherein the first input of the switch module is operably coupled to receive the test outbound baseband signals from the bidirectional integrated circuit pin and the second input of the switch module is operably coupled to receive the outbound baseband signals from the digital to analog converter section, and wherein the second dual function I/O module outputs, via the output, the test outbound baseband signals when a register setting indicates the test mode and outputs, via the output, the outbound baseband signals when the register setting indicates the normal mode of operation.

13. The integrated radio circuit of claim 10 further comprises:
third dual function input/output (I/O) module operably coupled to provide the inbound digital baseband signals to the digital baseband processing module when the integrated radio circuit is in a normal mode of operation and to provide test inbound digital baseband signals to the digital baseband processing module when the integrated radio circuit is in a second test mode.

14. The integrated radio circuit of claim 10 further comprises:
a fourth dual function I/O module operably coupled to provide the outbound digital baseband signals to the digital to analog converter section when the integrated radio circuit is in the normal mode of operation and to provide test outbound digital baseband signals to the digital to analog converter section when the integrated radio circuit is in a second test mode.

15. The integrated radio circuit of claim 10 further comprises:
a loop back multiplexer having a first input, a second input, and an output, wherein the first input of the loop back multiplexer is operably coupled to an output of the digital baseband processing module, the second input of the loop back multiplexer is operably coupled to an output of the analog to digital converter module, and the output of the loop back multiplexer is operably coupled to an input of the digital to analog converter section; wherein, during an ADC and DAC test portion of the test mode, the first dual function I/O module provides analog input test signals to the analog to digital converter module, which converts the analog input test signals to digital test signals, wherein the first loop back multiplexer provides the digital test signals to the digital to analog converter, which converts the digital test signals into analog output test signals, wherein the receiver section, the transmitter section, and the digital baseband processing module are inactive during the ADC and DAC test portion of the test mode.

16. The integrated radio circuit of claim 10 further comprises:
a loop back multiplexer having a first input, a second input, and an output, wherein the first input of the loop back multiplexer is operably coupled to an output of the analog to digital converter module, the second input of the loop back multiplexer is operably coupled to a digital output of the digital baseband processing module, and the output of the loop back multiplexer is operably coupled to a digital input of the digital baseband processing module, wherein during a digital baseband testing portion of the test mode, outbound test data is provided to the digital baseband processing module, which converts the outbound test data into outbound test baseband signals, wherein the loop back multiplexer provides the outbound test baseband signals to the input of the digital baseband processing module, which converts the outbound test baseband signals into inbound test data.

17. The integrated radio circuit of claim 10 further comprises:
a third dual function I/O module operably coupled to the digital baseband processing module, the transmitter section, and the receiver section, wherein, during a receiver test portion of the test mode, the third dual function I/O module provides receiver controls signals to the receiver section while the transmitter section, the analog to digital converter module, the digital to analog converter section, and the digital baseband processing module are inactive and, during a transmitter test portion of the test mode, the third dual function I/O module provides transmitter controls signals to the transmitter section while the receiver section, the analog to digital converter module, the digital to analog converter section, and the digital baseband processing module are inactive.

18. The integrated radio circuit of claim 10 further comprises:
a radio register operable to store transmitter settings corresponding to the transmitter section and to store receiver settings corresponding to the receiver section, wherein, during the test mode of the integrated radio circuit, test transmitter settings and test receiver settings are written into the radio register for testing the receiver section and the transmitter section.

19. An integrated radio circuit comprises:
a receiver section operably coupled to convert inbound radio frequency (RF) signals into inbound baseband signals;
a transmitter section operably coupled to convert selected outbound baseband signals into outbound RF signals;
analog to digital converter section operably coupled to convert inbound baseband signals into inbound digital baseband signals;
digital to analog converter section operably coupled to convert outbound digital baseband signals into the outbound baseband signals;
digital baseband processing module operably coupled to convert the inbound digital baseband signals into inbound data and to convert outbound data into the outbound digital baseband signals; and
a dual function I/O module operably coupled to the digital baseband processing module, the transmitter section, and the receiver section, wherein, during a receiver test mode, the dual function I/O module provides receiver controls signals to the receiver section while the transmitter section, the analog to digital converter module, the digital to analog converter section, and the digital baseband processing module are inactive and, during a transmitter test mode, the dual function I/O module provides transmitter controls signals to the transmitter section while the receiver section, the analog to digital converter module, the digital to analog converter section, and the digital baseband processing module are inactive.

20. The integrated radio circuit of claim 19 further comprises:
a second dual function input/output (I/O) module operably coupled to provide the inbound digital baseband signals to the digital baseband processing module when the integrated radio circuit is in a normal mode of operation and to provide test inbound digital baseband signals to the digital baseband processing module when the integrated radio circuit is in a second test mode.

21. The integrated radio circuit of claim 19 further comprises:
a third dual function I/O module operably coupled to provide the outbound digital baseband signals to the digital to analog converter section when the integrated radio circuit is in the normal mode of operation and to provide test outbound digital baseband signals to the digital to analog converter section when the integrated radio circuit is in a second test mode.

22. The integrated radio circuit of claim 19 further comprises:
a fourth dual function I/O module operably coupled between the receiver section and the analog to digital converter, wherein, in the normal mode of operation, the fourth dual function I/O module provides the inbound baseband signals to the analog to digital converter section and, in a second test mode, the fourth dual function I/O module provides the inbound baseband signals to a bidirectional integrated circuit pin.

23. The integrated radio circuit of claim 19 further comprises:
a fifth dual function I/O module operably coupled between the transmitter section and the digital to analog converter section, wherein, in the normal mode of operation, the fifth dual function I/O module provides the outbound baseband signals to the transmitter section and, in a second test mode, the fifth dual function I/O module provides test outbound baseband signals to the transmitter section.

24. The integrated radio circuit of claim 19 further comprises:
a loop back multiplexer having a first input, a second input, and an output, wherein the first input of the loop back multiplexer is operably coupled to an output of the digital baseband processing module, the second input of the loop back multiplexer is operably coupled to an output of the analog to digital converter module, and the output of the loop back multiplexer is operably coupled to an input of the digital to analog converter section; wherein, during an ADC and DAC test portion of the test mode, the first dual function I/O module provides analog input test signals to the analog to digital converter module, which converts the analog input test signals to digital test signals, wherein the first loop back multiplexer provides the digital test signals to the digital to analog converter, which converts the digital test signals into analog output test signals, wherein the receiver section, the transmitter section, and the digital baseband processing module are inactive during the ADC and DAC test portion of the test mode.

25. The integrated radio circuit of claim 19 further comprises:
a loop back multiplexer having a first input, a second input, and an output, wherein the first input of the loop back multiplexer is operably coupled to an output of the analog to digital converter module, the second input of the loop back multiplexer is operably coupled to a digital output of the digital baseband processing module, and the output of the loop back multiplexer is operably coupled to a digital input of the digital baseband processing module, wherein during a digital baseband testing portion of the test mode, outbound test data is provided to the digital baseband processing module, which converts the outbound test data into outbound test baseband signals, wherein the loop back multiplexer provides the outbound test baseband signals to the input of the digital baseband processing module, which converts the outbound test baseband signals into inbound test data.

26. The integrated radio circuit of claim 19 further comprises:

a radio register operable to store transmitter settings corresponding to the transmitter section and to store receiver settings corresponding to the receiver section, wherein, during the test mode of the integrated radio circuit, test transmitter settings and test receiver settings are written into the radio register for testing the receiver section and the transmitter section.

* * * * *